(12) United States Patent
Zapata et al.

(10) Patent No.: US 10,951,112 B2
(45) Date of Patent: Mar. 16, 2021

(54) APPARATUS FOR MINIMIZING PEAK POWER DEMAND ON INVERTER IN POWER SUPPLY WITH ONE OR MORE SWITCHED REACTIVE LOADS

(71) Applicant: Edge Electrons Limited, Hong Kong (HK)

(72) Inventors: Jian Carlo Decena Zapata, Pampanga (PH); Neal George Stewart, Makati (PH)

(73) Assignee: Edge Electrons Limited, Hong Kong (HK)

( * ) Notice: Subject to any disclaimer, the term of this patent is extended or adjusted under 35 U.S.C. 154(b) by 0 days.

(21) Appl. No.: 16/607,728

(22) PCT Filed: Apr. 26, 2018

(86) PCT No.: PCT/IB2018/052883
§ 371 (c)(1),
(2) Date: Oct. 24, 2019

(87) PCT Pub. No.: WO2018/198053
PCT Pub. Date: Nov. 1, 2018

(65) Prior Publication Data
US 2020/0059154 A1  Feb. 20, 2020

Related U.S. Application Data

(60) Provisional application No. 62/491,242, filed on Apr. 27, 2017.

(51) Int. Cl.
*H02M 1/32* (2007.01)
*H03M 1/34* (2006.01)
(Continued)

(52) U.S. Cl.
CPC .............. *H02M 1/32* (2013.01); *H02M 5/293* (2013.01); *H02M 1/34* (2013.01)

(58) Field of Classification Search
CPC .................................. H02M 1/32; H02M 1/34
(Continued)

(56) References Cited

U.S. PATENT DOCUMENTS

| 6,295,215 B1 * | 9/2001 | Faria ....................... H02J 9/062 363/124 |
| 8,659,279 B2 * | 2/2014 | George ................... H02M 1/32 323/272 |

(Continued)

*Primary Examiner* — Gary A Nash
(74) *Attorney, Agent, or Firm* — Idea Intellectual Limited; Margaret A. Burke; Sam T. Yip

(57) ABSTRACT

An apparatus is provided for minimizing the peak power demand on an inverter in a power supply with one or more switched reactive loads comprising an AC semiconductor bypass switch connected in parallel with the inverter and a bypass control device. The bypass control device includes filters for selecting load current signals with specific frequencies of interest from the switched reactive loads; a signal processor for sampling and transforming the selected load current signals into frequency domain to identify frequency components of the selected load current signal; an amplitude detector for detecting peak current amplitudes of the identified frequency components of the selected load current signal; and a bypass driver.

12 Claims, 4 Drawing Sheets

(51) Int. Cl.
*H02M 5/293* (2006.01)
*H02M 1/34* (2007.01)
(58) Field of Classification Search
USPC ....... 323/266, 274, 277; 361/13; 363/39, 41, 363/78, 97, 56.03, 56.12
See application file for complete search history.

(56) References Cited

U.S. PATENT DOCUMENTS

2007/0159862 A1* 7/2007 Vinciarelli .......... H02M 3/1584
363/65
2012/0181871 A1* 7/2012 Johansen ................ H02J 9/062
307/66
2016/0006295 A1* 1/2016 Yang ...................... H02J 7/34
307/66

* cited by examiner

APPARATUS FOR MINIMIZING PEAK POWER DEMAND ON INVERTER IN POWER SUPPLY WITH ONE OR MORE SWITCHED REACTIVE LOADS

CROSS-REFERENCE OF RELATED PATENTS AND PATENT APPLICATIONS

This application is the national phase entry of the International Application No. PCT/IB2018/052883, filed Apr. 26, 2018, which claims priority under the Paris Convention to the U.S. Provisional Patent Application No. 62/491,242, filed Apr. 27, 2017, the disclosure of which are incorporated herein by reference in their entirety.

FIELD OF THE INVENTION

The present invention generally relates to electronic AC-AC series voltage regulation topologies that utilize inverter power semiconductors to handle the total peak power to the load. Particularly, the present invention relates to minimizing the peak power demand on an inverter in a power supply with one or more switched reactive loads.

BACKGROUND

AC voltage regulators are used to closely control and regulate the AC voltage level being delivered to a load connected to the output of the AC voltage regulator, regardless of the AC voltage variation at the input of the AC voltage regulator. The electronic AC-AC series voltage regulation topology, can be either any "direct" topology such that the inverter power semiconductors have to handle the total peak power to the load, or any "indirect" electronic AC-AC series voltage regulation topology that utilizes a low frequency transformer (the low frequency transformer may be one selected from those disclosed in PCT Application No. PCT/IB2017/055260, the disclosure of which is incorporated by reference herein) that only processes a proportion of the total output power. In general, AC voltage regulators utilize inverter power semiconductor devices to handle the total peak power to the load. However, the inherent limited power handling capability of inverter power semiconductor devices may cause problems in the electronic AC-AC series voltage regulation. It is well-known that small semiconductor dies can only handle current transients of limited peak amplitudes from switched reactive loads owning to the limited critical thermal dissipation of the small power semiconductor die. When the inverter power semiconductor devices are connected to switched reactive loads, in particular, with high and very high momentary peak power currents, unnecessary and troublesome nuisance bypass operations can be triggered. Therefore, inverter power semiconductor devices have to be designed and specified with larger power handling capability, or even over specified, to handle high peak power transients, and generally larger power semiconductor devices are used than would otherwise be necessary to handle the more desirable lower average RMS or average power to the load.

FIG. 1 shows a general electronic AC-AC series voltage regulator with a standard legacy-bypass consisting typically of a semiconductor bypass switch, a mechanical relay or contactor bypass for protecting the inverter power semiconductor devices undergoing high peak currents and in accordance with a prior art example. The semiconductor bypass switch may be fast switching AC semiconductor devices such as TRIACS, or SCRs, either back-to-back, or with a rectifier bridge connected in parallel with the contacts of the slower mechanical relay or contactor. As such, the legacy-bypass may function as fast protective bypass with fast AC power semiconductors together with the slower mechanical relay or contactor. A current amplitude detector is used for detecting transient peak current amplitudes from the load current sensor and bypass drivers are used for triggering the legacy-bypass.

The switched loads may include resistive (R) loads and reactive loads which can include capacitive (C) and/or inductive (L) elements. FIG. 5 shows an inverter current waveform after implementing the apparatus as shown in FIG. 1. When reactive loads are switched to the inverter, momentary high peaks of the load current, which last only for microseconds or milliseconds, may induce a very high transient inverter current peak, up to 115.1 Amps, which exceeds the pre-set protective current level of the current amplitude detector such that the legacy-bypass is unnecessarily triggered. This may lead to disturbing bypasses that may cause annoying lighting flicker or even destructive voltage fluctuations. Therefore, the power demand on the inverter power semiconductor devices is to handle not only the average or RMS power dissipated by the resistive loads, but also the high amplitude momentary current peaks induced by the reactive loads. Therefore, inverter power semiconductors devices are usually sized, or even over specified, so as to maintain voltage regulation output without triggering the bypass.

SUMMARY

It is one objective of the present invention to directly alleviate or eliminate the critical industry inherent problem of the limited peak power handling ability of the inverter power semiconductor devices. According to one aspect of the present invention, an apparatus is provided for minimizing the peak power demand on an inverter in a power supply with one or more switched reactive loads comprising an AC semiconductor bypass switch connected in parallel with the inverter and a bypass control device. The bypass control device includes: one or more filters for selecting one or more load current signals with specific frequencies of interest from the switched reactive loads; a signal processor for sampling and transforming the selected load current signals into frequency domain to identify frequency components of the selected load current signal; an amplitude detector for detecting peak current amplitudes of the identified frequency components of the selected load current signal; and a bypass driver for driving the AC semiconductor bypass switch configured to divert a transient load current away from the inverter for overcurrent protection or act as an actively controlled current source to supply a transient load current of a required magnitude.

BRIEF DESCRIPTION OF THE DRAWINGS

Embodiments of the invention are described in more detail hereinafter with reference to the drawings, in which.

DETAILED DESCRIPTION

In the following description, methods, systems, and apparatuses for minimizing the peak power demand on an inverter in a power supply with one or more switched reactive loads in an AC-AC series voltage regulation topology and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
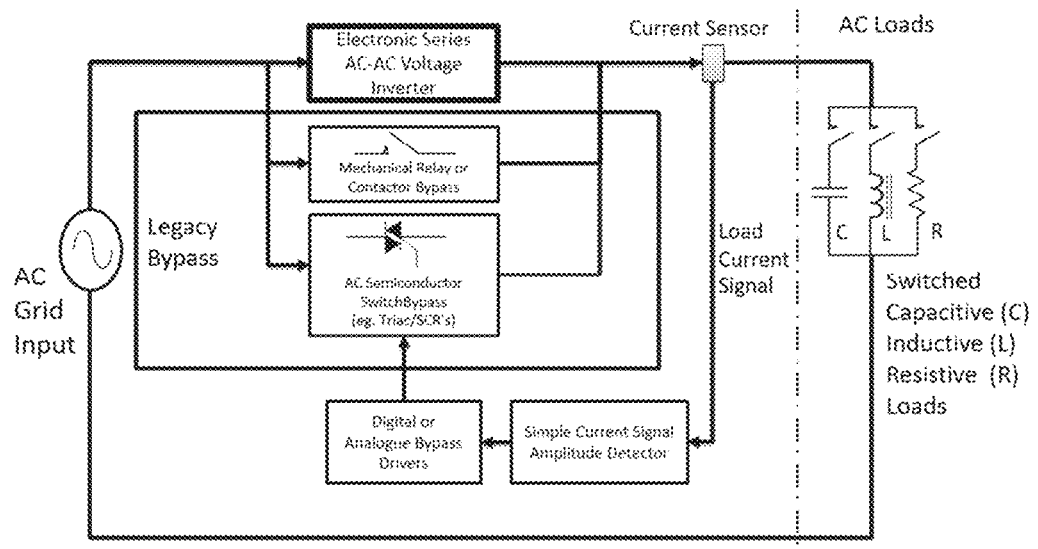
FIG. 1 depicts a general electronic AC-AC series voltage regulator with a standard legacy-bypass according to a prior art example.
Figure 2:
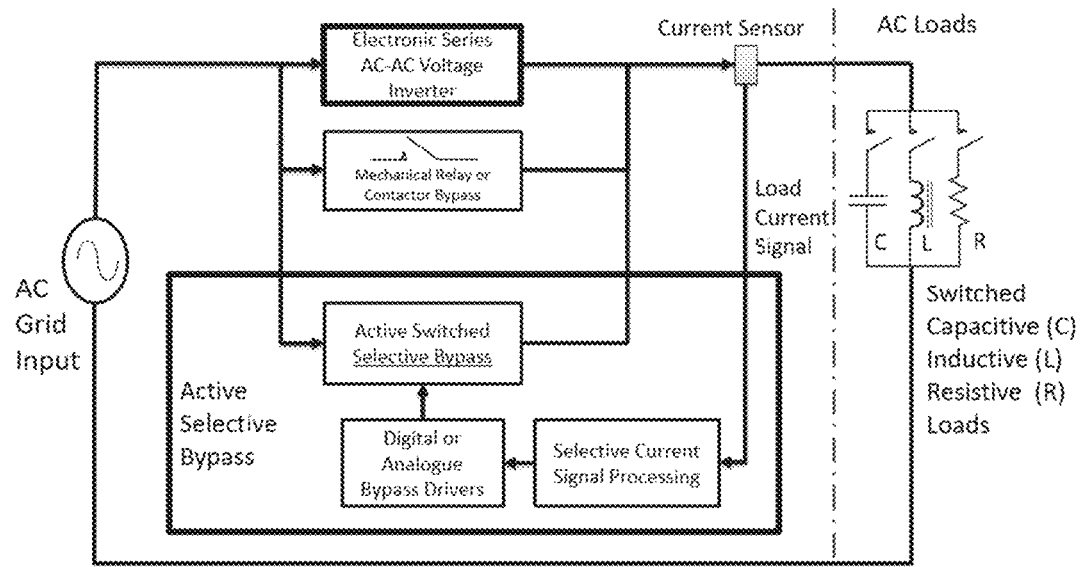
FIG. 2 depicts an apparatus for minimizing the peak power demand on an inverter in a power supply with one or more switched reactive loads in accordance with one embodiment of the present invention; wherein the AC semiconductor bypass switch is configured to divert a transient load current away from the inverter for overcurrent protection.

FIG. 2 shows an apparatus for minimizing the peak power demand on an inverter in a power supply with one or more switched reactive loads in accordance with one embodiment of the present invention. The apparatus comprises an AC semiconductor bypass switch connected in parallel with the inverter; and a bypass control device. The AC semiconductor bypass switch may be one of fast switching AC semiconductor devices such as TRIACS, or SCRs, either back-to-back, or with a rectifier bridge connected in parallel with the contacts of a slower mechanical relay or contactor. The AC semiconductor bypass switch may comprise one or more of back-to-back IGBTs, FETs, BJTs, or unipolar devices in a rectifier bridge structure incorporating IGBTs, FETs, BJTs as disclosed in PCT Application No. PCT/IB2017/055260, the disclosure of which is incorporated by reference herein.

The bypass control device may comprise one or more filters for selecting one or more load current signals with specific frequencies of interest from the switched reactive loads. The filters may include a high-pass filter to filter and select load current signals of high frequency transients and a low-pass filter to filter and select load current signals of low frequency transients.

The bypass control device may further comprise a signal processor for sampling and transforming the selected load current signals into frequency domain to identify frequency components of the selected load current signal. Preferably, the signal processor may use a Fourier Transform approach in sampling and transforming the filtered and selected load current signals into frequency domain.

The bypass control device may further comprise an amplitude detector for detecting peak current amplitudes of identified frequency components of the selected load current signal. When the detected transient peak current exceeds a pre-set protective current level, the current amplitude detector drives the bypass drivers to trigger the legacy-bypass.

The bypass control device may further comprise a digital or analog comparator for comparing detected peak current amplitudes of the identified frequency components of a selected load current signal with one or more reference values set to protect the AC-AC series regulator inverter power semiconductor devices.

The bypass control device may further comprise a bypass driver for driving the AC semiconductor bypass switch to bypass the selected load current when any one of the detected peak current amplitudes of the identified frequency components of the selected load current signal is higher than its respective reference value. Preferably, the bypass driver may comprise a proportional-integral-derivative (PID) error amplifier for adjusting a driving signal to the AC semiconductor bypass switch.

The AC semiconductor bypass switch may be configured to divert a transient load current away from the inverter for overcurrent protection as shown in FIG. 2, and preferably, the AC semiconductor bypass switch operates functionally in a saturation region of its V-I characteristic curve.

Figure 3:
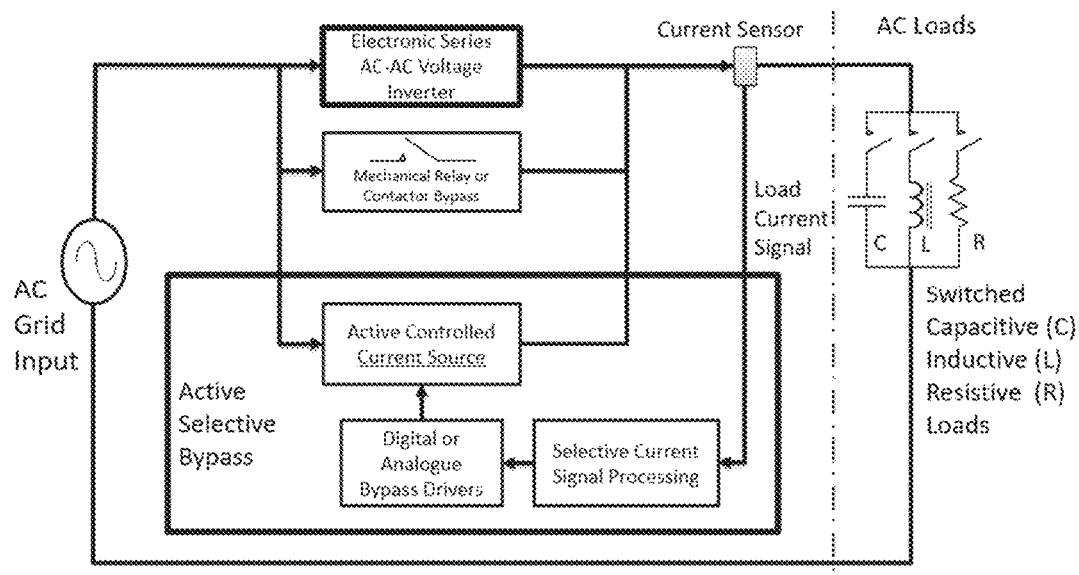
FIG. 3 depicts another apparatus for minimizing the peak power demand on an inverter in a power supply with one or more switched reactive loads in accordance with one embodiment of the present invention; wherein the AC semiconductor bypass switch is configured to act as an actively controlled current source to supply a transient load current of a required magnitude.

Alternatively, as shown in FIG. 3, the AC semiconductor bypass switch may be configured to act as an actively controlled current source to supply a transient load current of a required magnitude and preferably, the AC semiconductor bypass switch operates functionally in an active region of its V-I characteristic curve such that the AC semiconductor bypass switch supplies the transient load current of a required magnitude in response to a driving signal from the bypass driver.

Optionally, the AC semiconductor bypass switch may be configured to always bypass of a certain amount of current such that the inverter acts as a voltage reference for voltage regulation.

In some embodiments, the apparatus may further comprise a semiconductor relay device and an electromechanical bypass device, both connected across in parallel with the primary of the transformer or magnetic structure. The semiconductor relay device and the electromechanical bypass device are triggered and controlled by the bypass control device to divert the transient load current away from the inverter for overcurrent protection.

In some embodiments, the apparatus may further comprise a current transformer (CT) for measuring the load current waveform to be fed to the switched reactive loads.

Figure 4:
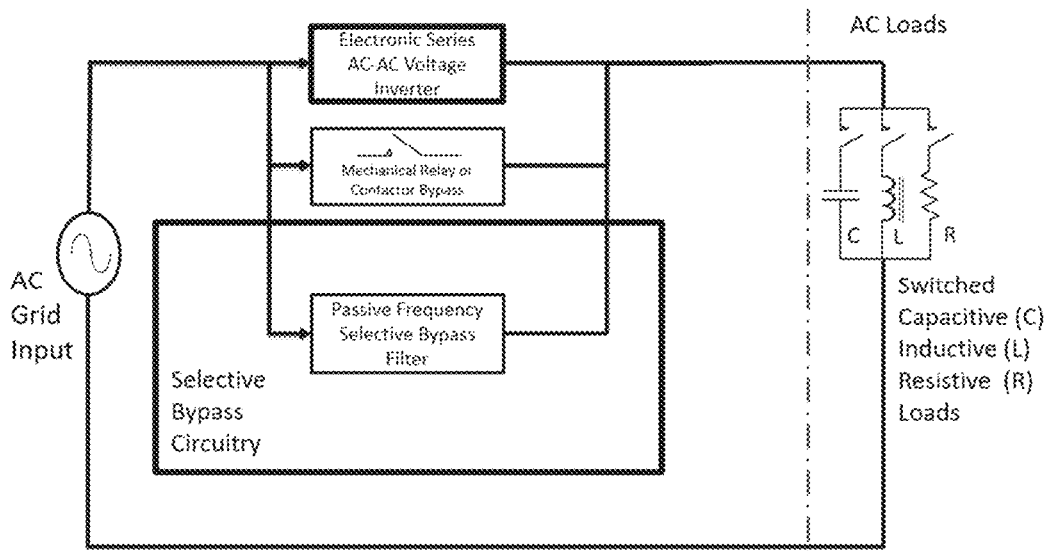
FIG. 4 depicts another apparatus for minimizing the peak power demand on an inverter in a power supply with one or more switched reactive loads in accordance with one embodiment of the present invention.
Figure 5:
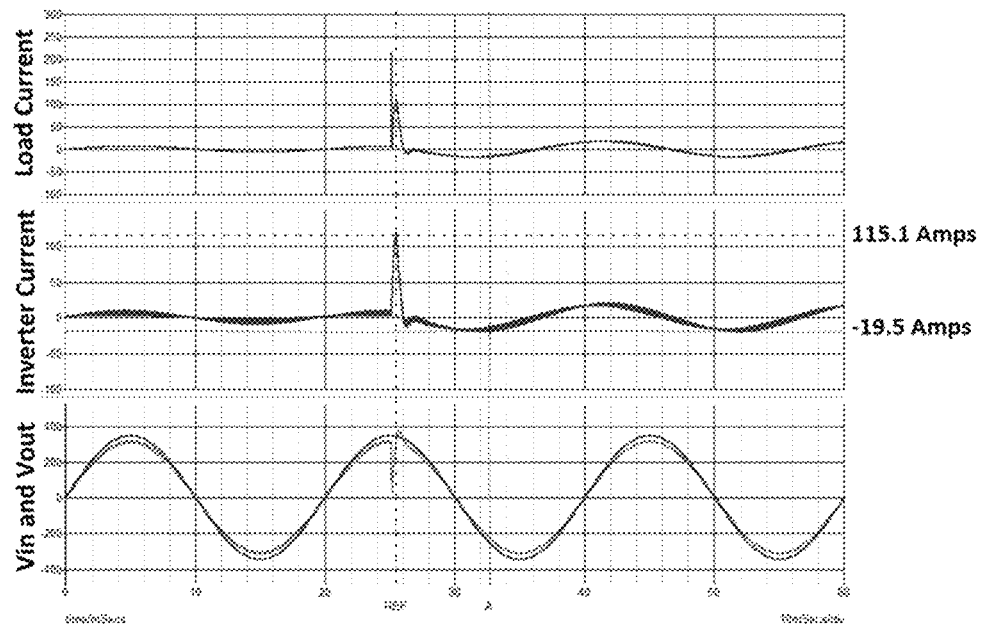
FIG. 5 shows an inverter current waveform after implementing the apparatus as shown in FIG. 1.

In one embodiment, as shown in FIG. 4, the apparatus may comprise a passive frequency selective bypass device acting as a current pass filter. Filtered transient load current signals are diverted away from the inverter for overcurrent protection.

With the present invention, as the load current signals can be selectively processed, different momentary current peaks can be bypassed selectively such that the AC-AC series voltage regulator can normally and simply step and settle to an average or RMS load power without falsely triggering the bypass.

Figure 6:
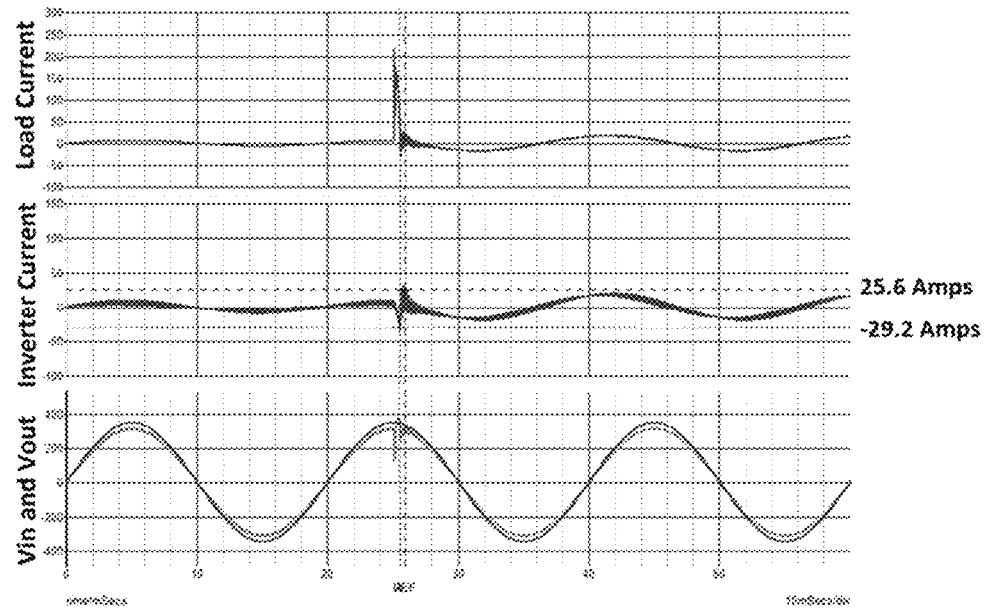
FIG. 6 shows an inverter current waveform after implementing the apparatus as shown in FIG. 2.

FIG. 6 shows an improved inverter current waveform after implementing the apparatus as shown in FIG. 2, wherein the AC semiconductor bypass switch is configured to divert a transient load current away from the inverter for overcurrent protection. The amplitude of the transient inverter current peak is reduced to 25.6 Amps.

Figure 7:
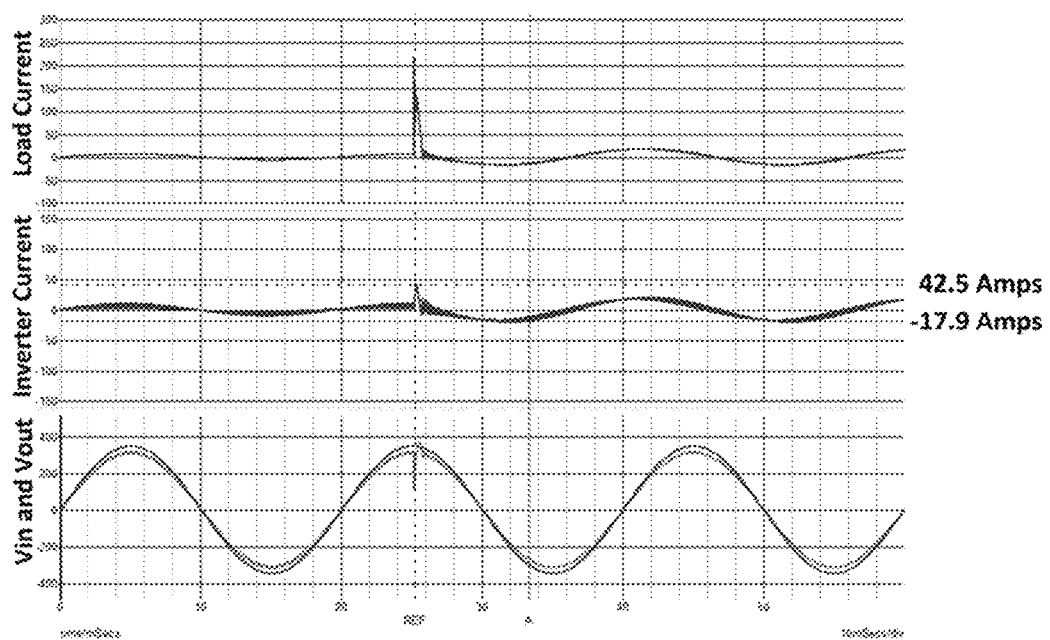
FIG. 7 shows an inverter current waveform after implementing the apparatus as shown in FIG. 3.

FIG. 7 shows an improved inverter current waveform after implementing the apparatus as shown in FIG. 3, wherein the AC semiconductor bypass switch is configured to act as an actively controlled current source to supply a transient load current of a required magnitude.

Although the foregoing description and the drawings describe only a single-phase AC system, any ordinarily skilled person in the art can apply the inventive principles described herein to any poly-phase AC systems, such as three-phase electrical systems, without departing from the scope and spirit of the invention.

The embodiments disclosed herein may be implemented using general purpose or specialized computing devices, computer processors, microcontrollers, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. An apparatus for minimizing the peak power demand on an inverter in a power supply with one or more switched reactive loads, comprising:
    an AC semiconductor bypass switch connected in parallel with an inverter;
    and
    a bypass control device comprising:
        one or more filters for selecting one or more load current signals with specific frequencies of interest from the switched reactive loads;
        a signal processor for sampling and transforming the selected load current signals into frequency domain to identify frequency components of the selected load current signal;
        an amplitude detector for detecting peak current amplitudes of identified frequency components of the selected load current signal; and
        a bypass driver for driving the AC semiconductor bypass switch configured to divert a transient load current away from the inverter for overcurrent protection or act as an actively controlled current source to supply a transient load current of a required magnitude.

2. The apparatus of claim 1, wherein the signal processor uses a Fourier Transform approach in sampling and transforming the filtered and selected load current signals into frequency domain.

3. The apparatus of claim 1, wherein the bypass control device comprises a high-pass filter to filter and select load current signals of high frequency transients.

4. The apparatus of claim 1, wherein the bypass control device comprises a low-pass filter to filter and select load current signals of low frequency transients.

5. The apparatus of claim 1, wherein the AC semiconductor bypass switch operates functionally in a saturation region of its V-I characteristic curve when the AC semiconductor bypass switch is configured to divert the transient load current away from the inverter for overcurrent protection.

6. The apparatus of claim 1, wherein the AC semiconductor bypass switch operates functionally in an active region of its V-I characteristic curve such that the AC semiconductor bypass switch supplies the transient load current of a required magnitude in response to a driving signal from the bypass driver when the AC semiconductor bypass switch is configured to act as an actively controlled current source.

7. The apparatus of claim 1, wherein the AC semiconductor bypass switch is configured to always bypass of a certain amount of current such that the inverter acts as a voltage reference for voltage regulation.

8. The apparatus of claim 1, wherein the bypass control device further comprises a digital or analog comparator for comparing detected peak current amplitudes of identified frequency components of a selected load current signal with one or more reference values.

9. The apparatus of claim 8, wherein the bypass driver drives the AC semiconductor bypass switch to bypass the selected load current when any one of detected peak current amplitudes of the identified frequency components of the selected load current signal is higher than its respective reference value.

10. The apparatus of claim 1, wherein the AC semiconductor bypass switch comprises one or more of back-to-back IGBTs, FETs, BJTs, or unipolar devices in a rectifier bridge structure incorporating IGBTs, FETs, BJTs.

11. The apparatus of claim 1, further comprising a semiconductor relay device and an electromechanical bypass device, both connected across in parallel with the primary of a transformer or magnetic structure;
    wherein the semiconductor relay device and the electromechanical bypass device are triggered and controlled by the bypass control device to divert the transient load current away from the inverter for overcurrent protection.

12. The apparatus of claim 1, further comprising a current transformer (CT) for measuring the load current waveform to be fed to the switched reactive loads.

* * * * *